United States Patent [19]
Frecska

[11] Patent Number: 5,816,751
[45] Date of Patent: Oct. 6, 1998

[54] WEDGING SYSTEM FOR REPLACEABLE CUTTING BLADE INSERTS

[76] Inventor: Laszlo Frecska, 1034 Devonshire, Highland Park, Ill. 60035

[21] Appl. No.: 730,220

[22] Filed: Oct. 15, 1996

Related U.S. Application Data

[60] Provisional application No. 60/009,384 Dec. 29, 1995.

[51] Int. Cl.⁶ ...................................................... B23C 5/22
[52] U.S. Cl. .............................. 407/108; 407/41; 144/230
[58] Field of Search ................................ 407/41, 49, 108; 144/230, 174, 117.1; 409/234, 236, 241

[56] References Cited

U.S. PATENT DOCUMENTS

| | | | |
|---|---|---|---|
| 987,479 | 3/1911 | Michell | ..................................... 144/230 |
| 2,229,112 | 1/1941 | Miller et al. | ........................... 407/41 X |

FOREIGN PATENT DOCUMENTS

| | | | |
|---|---|---|---|
| 388606 | 6/1965 | Switzerland | ............................ 144/230 |
| 428117 | 5/1935 | United Kingdom | ..................... 407/41 |

*Primary Examiner*—A. L. Pitts
*Assistant Examiner*—Henry W. H. Tsai
*Attorney, Agent, or Firm*—Leo J. Aubel

[57] ABSTRACT

An improved system for mounting replaceable cutter blade insert for a thread milling tool including, and improved wedge mounting construction for readily mounting and aligning the insert in position on the cutting tool.

6 Claims, 1 Drawing Sheet

WEDGING SYSTEM FOR REPLACEABLE CUTTING BLADE INSERTS

BACKGROUND OF THE INVENTION

The present invention relates to readily replaceable cutter blade assemblies for thread milling tools. The prior art discloses thread milling cutter tool assemblies having a series of cutter blades positioned in spaced relation to each other in slots formed in the periphery of the tool and parallel to the axis of the tool; such as, for example U.S. Pat. No. 5,112,162. In such assemblies the cutter blades are inserted in the slots and secured by wedges and screws.

SUMMARY OF INVENTION

A wedging system having an improved structure for mounting, positioning and replaceably securing cutter blades on the tool. Improved wedging means are provided for mounting the cutter blades in associated slots in the periphery of the tool.

The foregoing features and advantages of the present invention will be apparent from the following more particular description of the invention. The accompanying drawings, listed hereinbelow, are useful in explaining the invention.

DESCRIPTION OF THE INVENTION

Figure 1:
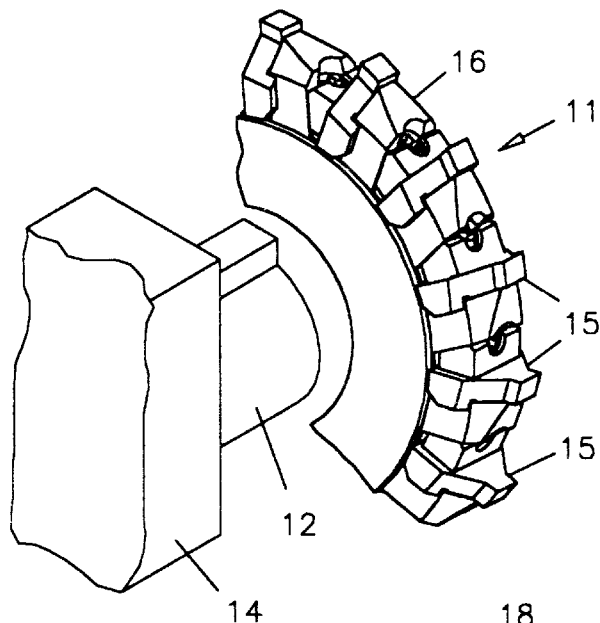
FIG. 1 is an partially cut-way isometric view of the inventive key milling tool mounted for operation.

FIG. 1 shows the milling tool assembly 11 for milling keys which assembly is mounted on a suitable rotating shaft 12 of an associated milling machine controlled by a suitable microprocessor. In a preferred embodiment there are a number of key milling or key groove cutting or cutter inserts 15 mounted on the periphery of the cutting tool 16 which in turn is mounted on shaft 12 of the milling machine. Each insert 15 is separately and individually mounted on tool 16, as will be explained; and also, the inserts can be readily and individually removed from tool 16 and replaced, as will become clear.

The inserts 15 are mounted in respective slots 17 on the periphery of tool 16 and extend outwardly from the periphery of tool 16. The slots 17 are open rectangular recesses on the periphery of tool 16, and each slot includes radially extending walls 18 and 19. The bottom 20 of slot 17 is planar and receives the cutting insert 15.

Figure 3:
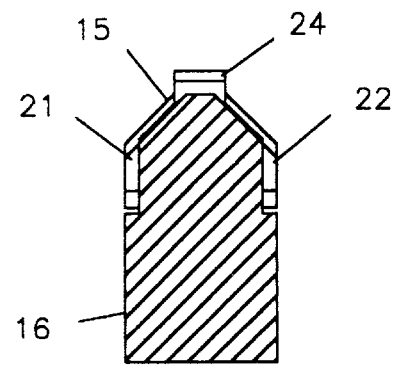
FIG. 3 is a view of the cutter insert on the tool to indicate the positioning thereof.
Figure 2:
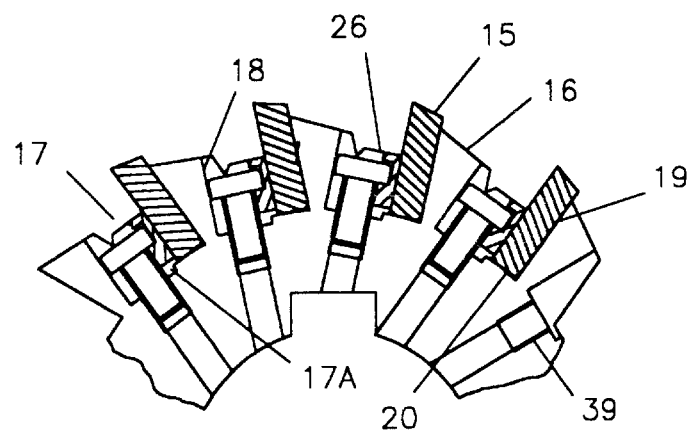
FIG. 2 is a side view of a key milling tool, partially cut-away to show the orientation of the cutter insert, the wedge and the securing screw.

As indicated in FIG. 2, each cutter insert 15 will be positioned to abut one wall 19 of slot 17. FIG. 3 is an end view of the insert 15 mounted on tool 16. An insert 15 is shown in relatively enlarged view in FIG. 4, and comprises an upstanding U-shaped member having side walls 21 and 22 joined to a back wall 23 which includes a protruding cutting section or blade 24. The cutting section 24 may have one of various desired shapes dependent on the cut or groove to be made in a blank, such as a key blank.

Figure 5:
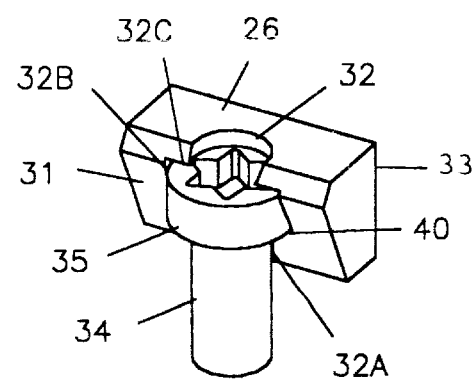
FIG. 5 is an isometric view to show the relation of the wedge and the securing screw.

Refer now also to FIG. 5 as well as FIG. 2. An associated wedge 26 secures the respective cutter insert 15 in position in each slot 17. Wedge 26 comprises an elongated rectangular member having an angled front wall 31 and a flat back wall 33. A semi-cylinder recess 32 is formed centrally in front wall 31. Recess 32 includes a first section 32A for receiving the body of a securing screw 34, and an enlarged upper section 32B for receiving the head 35 of screw 34. Screw 34 is received and secured in threaded holes 39 formed in tool 16, as indicated in FIG. 2.

As will readily be appreciated, screws are inserted into recess 32 to force the angled wedge 26 inwardly (toward the axis of the tool) into slot 17 to bear against cutter insert 15 and firmly wedge and secure the insert against wall 19 of slot 17. As indicated in FIG. 2, there is a space 17A between the bottom surface of insert 15 and the bottom of slot 17 to allow for inward movement of wedge 26 when the screw 34 is tightened.

A semi-circular shoulder 40 is formed between sections 32A and 32B of recess 32. Also a cap or upper shoulder 32C is formed in recess 32 for purposes to now be explained. The head 35 of screw 34 engages shoulder 40 to provide a means for forcing or pulling the wedge 26 inwardly toward the axis of the tool 16, as screw 34 is tightened, to thereby bear and force against insert 15 to securely wedge the insert 15 in position. The side of the screw head 35 bears against wall 18 of slot 17. The head 35 of screw 34 is cradled and retained in the screw recess 32 by a cap or upper shoulder 32C; hence to remove the wedge 26 and insert 15, the screw 34 is turned and the head 35 forces upwardly against cap 32C to loosen wedge 26.

Figure 4:
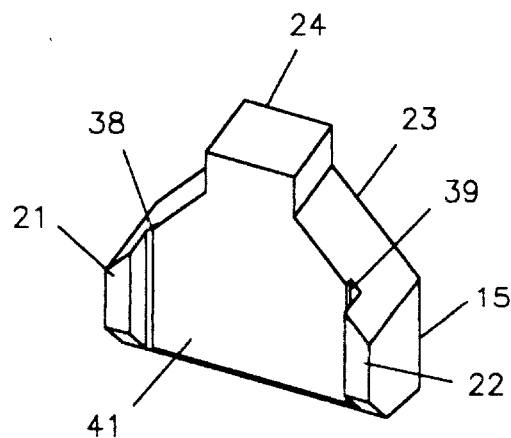
FIG. 4 is a relatively enlarged isometric view of the cutter insert.

Importantly, inserts 15 are self aligning and self positioning in slots 17. As best shown in FIGS. 1 and 3, walls 21 and 22 of inserts 15 are formed to firmly fit and straddle tool 16 adjacent slots 17. This assures that inserts 15 are securely aligned in proper position relative to the blank to be cut and also are securely aligned in position relative to one another. As shown in FIG. 4, the back wall 23 of insert 15 includes vertical recesses or grooves 38 and 39 at opposites ends or corners of the wall 23, adjacent respective side walls 21 and 22. Any aberrations on the edges of the walls of insert 15 or on the wall 19 of slot 17 do not compromise the positioning of insert 15; this assures a true flat outstanding surface 41 to provide proper spacing and positioning of the insert 15 in slot 17;

The inserts 15 are subject to substantial forces and pressures from the cutting action, and the slots 17 must be deep enough such that the inserts have a firm back support provided by the wedge 26 and wall 19. Likewise the wedges 26 must provide a firm force to the front of the respective insert 15 to prevent any tipping, wobbling or other movement. The screw 34 provides a side thrusting force or pressure against wedge 26, and in addition to the side pressure provided to the wedge 26, the head of screw 34 also provides a downward holding force on the wedge to assure that the wedge, in turn, provides the necessary holding force against the insert 15.

The inventive system provides the following advantages:
1. The inventive wedging system provides relatively higher securing forces for the inserts.
2. With the same screw the wedge can be pushed into the slot and pulled out of the slot.
3. Each insert and wedge of the invention requires less space for mounting; and, hence more inserts can be mounted on the tool. This increases the speed of operation which in turn increases productivity. Since more cutting inserts can be provided for a given tool, this provides significant more cutting surface. In a two inch diameter tool fifteen inserts can be mounted as compared with twelve inserts with prior art tools; an estimated 24% improvement. The screw for holding the wedge can also be smaller and yet provide an improved securing force.

4. The angle of the wedge can be varied to provide a varying force. There is a higher amplification of force at the lower angles.

While the invention has been particularly shown and described with reference to a preferred embodiment thereof, it will be understood by those skilled in the art that various changes in form and details may be made therein without departing from the spirit and scope of the invention.

I claim:

1. A wedging system for cutting blade inserts for a cutting tool mountable for rotating operation comprising, in combination:

a) cutting inserts each comprising an upstanding U-shaped member having first and second side walls, a front wall and a back wall, said back wall having a top end, a cutting blade on said top end of said back wall;

b) said tool having spaced slots on its periphery for receiving respective ones of said inserts; said slots having upstanding side walls;

c) said front wall of each said insert positioned to bear against a side wall of a respective slot;

d) wedging means comprising a wedge and a screw for each insert;

e) screw holes extending inwardly from said slot into said tool for receiving respective screws;

f) each said wedge having a flat wall and an angled wall, a recess formed on said angled wall, said recess having a first section for receiving the body of a respective screw, and a second section for receiving the head of said respective screw, a shoulder formed between said first and second sections which shoulder is engaged by the head of said respective screw to force said wedge inwardly and said second section having a cap which is engaged by the head of said respective screw to push said wedge outwardly; and, g) said wedge forcing against said back wall of the respective insert with an increasingly greater force as said respective screw is screwed into said tool.

2. A wedging system as in claim 1, including vertical relief recesses between said front wall and said side walls of each of said inserts for providing a true planar surface for mounting each said insert in each said respective slot of said tool.

3. A wedging system as in claim 1 wherein the head of said respective screw engages and forces against one of said walls of said respective slot.

4. A wedging system for cutting inserts for a circular cutting tool mountable for rotating operation comprising, in combination:

a) inserts each including a cutting blade protruding from the periphery of said tool;

b) said tool having spaced slots on its periphery for receiving respective ones of said inserts;

c) wedging means for each insert, said wedging means comprising a wedge and a screw having a head mountable in each of said slots adjacent said inserts;

d) screw holes in said slots for receiving respective ones of said screws;

e) said wedges each having a flat back wall and an angled front wall, a recess formed on said angled wall for receiving said head of a respective one of said screws, the head of said screws selectively forcing said wedge inwardly and outwardly of the respective one of said slots to thereby force against the respective one of said inserts; and f) each said wedge forcing against said respective one of said inserts with an increasingly greater force as said respective screw is screwed into said tool.

5. A wedging system as in claim 1 wherein said recess formed in each said wedge is semi-circular in shape and forms a partially enclosing cavity for said head of said respective screw whereby screwing said screw outwardly moves said wedge out of said respective slot.

6. A wedging system as in claim 5 wherein said head of said respective screw bears against a side wall of said respective slot.

* * * * *